US012077411B2

(12) United States Patent
Vuorenala et al.

(10) Patent No.: US 12,077,411 B2
(45) Date of Patent: Sep. 3, 2024

(54) ELEVATOR SIGNALIZATION APPARATUS

(71) Applicant: KONE Corporation, Helsinki (FI)

(72) Inventors: Jere Vuorenala, Helsinki (FI); Niko Elomaa, Helsinki (FI); Jouni Ratia, Helsinki (FI); Sampo Mäkilaurila, Helsinki (FI); Timo Mertanen, Helsinki (FI); Harri Länsiö, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1412 days.

(21) Appl. No.: 16/549,887

(22) Filed: Aug. 23, 2019

(65) Prior Publication Data

US 2020/0062541 A1 Feb. 27, 2020

(30) Foreign Application Priority Data

Aug. 23, 2018 (EP) .................................... 18190445

(51) Int. Cl.
*B66B 1/34* (2006.01)
*B66B 1/28* (2006.01)
(Continued)

(52) U.S. Cl.
CPC .............. *B66B 1/3461* (2013.01); *B66B 1/28* (2013.01); *B66B 1/468* (2013.01); *B66B 1/52* (2013.01); *B66B 3/002* (2013.01); *B66B 2201/101* (2013.01); *B66B 2201/103* (2013.01); *B66B 2201/4607* (2013.01);
(Continued)

(58) Field of Classification Search
CPC ....... B66B 1/468; B66B 5/0012; B66B 3/002; B66B 1/3461; B66B 1/34; B66B 2201/222; B66B 1/3415; B66B 2201/4653; B66B 2201/463; B66B 1/3446; B66B 1/3423; B66B 3/008; B66B 2201/4676; B66B 2201/402; B66B 2201/4607
See application file for complete search history.

(56) References Cited

U.S. PATENT DOCUMENTS

2008/0306961 A1* 12/2008 Pineau .................... G05B 15/00
2019/0135580 A1* 5/2019 Scoville .................. B66B 1/468
2021/0032075 A1* 2/2021 Muncy .................. B66B 1/3461

FOREIGN PATENT DOCUMENTS

DE 112009002258 T5 * 7/2011 ............. B66B 1/468
EP 3599198 A1 * 1/2020 ........... B66B 1/2458
(Continued)

OTHER PUBLICATIONS

Extended European Search Report for European Patent Application No. 18190445.9, dated Mar. 20, 2019.

*Primary Examiner* — Marlon T Fletcher
(74) *Attorney, Agent, or Firm* — Birch, Stewart, Kolasch & Birch, LLP

(57) ABSTRACT

According to an aspect, there is provided an elevator signalization apparatus. The elevator signalization apparatus comprises first receiving means for receiving floor information representing floor occupancy information associated with a building; output means for indicating floor occupancy to a user; second receiving means for receiving user associated information; and transmitting means for transmitting a control signal to an elevator controller based on the received user associated information.

20 Claims, 9 Drawing Sheets

(51) Int. Cl.
*B66B 1/46* (2006.01)
*B66B 1/52* (2006.01)
*B66B 3/00* (2006.01)

(52) U.S. Cl.
CPC ................. *B66B 2201/4615* (2013.01); *B66B 2201/4623* (2013.01); *B66B 2201/463* (2013.01); *B66B 2201/4638* (2013.01); *B66B 2201/4653* (2013.01)

(56) References Cited

FOREIGN PATENT DOCUMENTS

| | | | | | |
|---|---|---|---|---|---|
| EP | 3613690 | A1 | * | 2/2020 | ............... B66B 1/28 |
| EP | 3943430 | A1 | * | 1/2022 | ............. B66B 1/468 |
| JP | H11-146392 | A | | 5/1999 | |
| JP | 2004-161434 | A | | 6/2004 | |
| JP | 5413759 | B2 | * | 2/2014 | |
| JP | 2015-228072 | A | | 12/2015 | |
| KR | 20130005579 | A | * | 1/2013 | |
| KR | 20180039147 | A | * | 4/2018 | |
| WO | WO-2008150142 | A2 | * | 12/2008 | ........... B66B 1/2433 |
| WO | WO-2011037280 | A1 | * | 3/2011 | ........... B66B 1/3492 |
| WO | WO-2019087242 | A1 | * | 5/2019 | ............... B66B 1/20 |

* cited by examiner

ELEVATOR SIGNALIZATION APPARATUS

BACKGROUND

Flexible office spaces are getting more common. More and more people have an opportunity to work from home part-time or a company may have only occasional needs for an office environment. Further, in some offices, employees do not have dedicated workspaces. Once arriving at the office, one can choose any free space to work for the day. However, if there are, for example, flexible office spaces in multiple floors in a building, the people arriving may not know in which floors there are still room. This may cause unnecessary load and traffic in the elevators of the building.

Thus, it would be beneficial to alleviate at least some of these drawbacks.

SUMMARY

According to at least some of the aspects, a solution is provided that enables better service for people working in an office and people visiting the office. Elevator call giving devices may be configured to provide data about the actual usage level of areas of a building to help to optimize traffic in the building. By providing floor occupancy information with elevator signalization devices of an elevator system, users can select their destination floor based on the occupancy information. Further, in an embodiment, a space may be reserved for the users according to their selection.

According to a first aspect, there is provided an elevator signalization apparatus. The elevator signalization apparatus comprises first receiving means for receiving floor information representing floor occupancy information associated with a building; output means for indicating floor occupancy to a user; second receiving means for receiving user associated information; and first transmitting means for transmitting a control signal to an elevator controller based on the user associated information.

In an embodiment, the output means comprises at least one of a display, a touch-sensitive screen or a lighting arrangement.

In an embodiment, in addition or alternatively, the output means are integrated with the second receiving means.

In an embodiment, in addition or alternatively, the second receiving means are configured to identify the user based on the user associated information; and wherein the apparatus further comprises processing means for obtaining preference data based on the user identification and for filtering the floor occupancy information based on the preference data.

In an embodiment, in addition or alternatively, the second receiving means are configured to identify the user based on the user associated information; and wherein the apparatus further comprises; and second transmitting means for transmitting user identification information to a floor occupancy information system; wherein the received floor information has been filtered based on the user identification information.

In an embodiment, in addition or alternatively, the floor occupancy information system comprises an elevator controller or a floor occupancy monitoring system of the building.

In an embodiment, in addition or alternatively, the second receiving means comprises at least one of a push button, a virtual button or gesture recognition means.

In an embodiment, in addition or alternatively, the input from the user comprises at least one of a destination call, a car call, a seat area selection or a seat selection.

In an embodiment, in addition or alternatively, the control signal comprises an elevator call.

In an embodiment, in addition or alternatively, the elevator signalization apparatus further comprises third transmitting means for transmitting the seat area selection or the seat selection to the floor occupancy system.

According to a second aspect, there is provided a controller of an elevator system. The controller comprises at least one processing unit; at least one memory; wherein the at least one memory stores program instructions that, when executed on the at least one processing unit, causes the controller to receive floor information representing floor occupancy information associated with a building; send the floor occupancy information to an elevator signalization apparatus; receive a control signal from the elevator signalization apparatus; and control operation of an elevator car according to the control signal.

In an embodiment, the at least one memory stores program instructions that, when executed on the at least one processing unit, causes the controller to receive user identification information from the elevator signalization apparatus; filter the floor information based on the user identification information; and send the filtered floor information to the elevator signalization apparatus.

According to a third aspect, there is provided an elevator system comprising the elevator signalization apparatus of the first aspect and the controller of the second aspect.

In an embodiment, the elevator signalization apparatus is arranged in at least one of an elevator car or an elevator lobby.

In an embodiment, in addition or alternatively, the elevator signalization apparatus is a remote elevator signalization apparatus.

According to a fourth aspect, there is provided a method for providing floor occupancy information. The method comprises receiving floor information representing floor occupancy information associated with a building; indicating floor occupancy to a user; receiving user associated information; and transmitting a control signal to an elevator controller based on the received user associated information.

In an embodiment, in addition or alternatively, the method further comprises identifying the user based on the user associated information; obtaining preference data based on the user identification; and filtering the floor occupancy information based on the preference data.

In an embodiment, in addition or alternatively, the method further comprises identifying the user based on the user associated information; and transmitting the user identification information to a floor occupancy information system, wherein the received floor occupancy information has been filtered based on the user identification information.

In an embodiment, in addition or alternatively, the floor occupancy information system comprises an elevator controller or a floor occupancy monitoring system of the building.

In an embodiment, in addition or alternatively, the input from the user comprises at least one of a destination call, a car call, a seat area selection or a seat selection.

In an embodiment, in addition or alternatively, the control signal comprises an elevator call.

In an embodiment, in addition or alternatively, further comprising transmitting the seat selection or seat area selection to the floor occupancy system.

According to fifth aspect, there is provided a method for providing floor occupancy information. The method comprises receiving floor information representing floor occupancy information associated with a building; sending the floor information to an elevator signalization apparatus; receiving a control signal from the elevator signalization apparatus; and controlling operation of an elevator car according to the control signal.

In an embodiment, the at least one memory stores program instructions that, when executed on the at least one processing unit, causes the controller to receive user identification information from the elevator signalization apparatus; filter the floor information based on the user identification information; and send the filtered floor information to the elevator signalization apparatus.

According to sixth aspect, there is provided a computer program comprising program code, which when executed by at least one processing unit, causes the at least one processing unit to perform the method of the fourth or fifth aspect.

According to sixth aspect, there is provided a computer readable medium comprising a computer program comprising program code, which when executed by at least one processing unit, causes the at least one processing unit to perform the method of the fourth or fifth aspect.

The above discussed means may be implemented, for example, using at least one processor, at least one processor and at least one memory connected to the at least one processor, or at least one processor, at least one memory connected to the at least one processor and an input/output interface connected to the at least one processor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
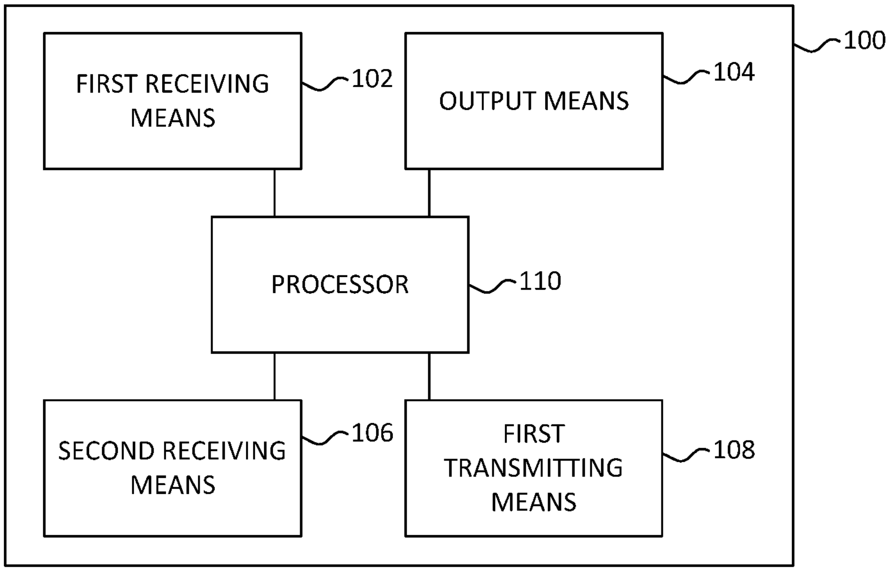
FIG. 1 illustrates an elevator signalization apparatus according to an embodiment.

FIG. 1 illustrates an elevator signalization apparatus 100 according to an embodiment. The elevator signalization apparatus 100 may be a destination call panel located in an elevator lobby, a car call panel inside an elevator car or a remote call giving device, for example, a mobile device or a mobile phone operated by a user. The apparatus 100 may also comprise an application executed in it that enables elevator call signalization.

The elevator signalization apparatus 100 comprises first receiving means 102 for receiving floor information representing floor occupancy information associated with a building. The floor information may be received, for example, from an elevator controller or a floor occupancy monitoring system. The floor information may indicate working spaces that are available in each floor of the building. Further, the floor information may comprise occupied working spaces. The received floor information may be data gathered, for example, by at least one of a sensor system, thermal cameras, laptop docking devices or a reservation system enabling radio frequency identification (RFID) at each working space or at lobbies of the floors.

The elevator signalization apparatus 100 further comprises output means 104 for indicating the floor occupancy to guide a user based on the floor information. The output means 104 may comprise, for example, a display, a touch-sensitive screen or a lighting arrangement. The lighting arrangement may be configured to indicate the floor occupancy with light intensity or different colors, such as red light indicating that a floor is fully occupied, yellow indicating that there is only some space left and green indicating that the floor has plenty of free working spaces available.

Further, the elevator signalization apparatus 100 comprises second receiving 106 means for receiving user associated information. The second receiving means 106 may comprise, for example, at least one push button, virtual button, a touch-sensitive screen and/or gesture recognition means. The user associated information may comprise, for example, a destination call, a car call, a seat area selection or a seat selection in a specific floor of the building. In an embodiment, the output means 104 may be integrated with the second receiving means 106. For example, the elevator signalization apparatus 100 may be a destination call panel located in an elevator lobby. As an example, a touch-sensitive panel may provide both the output means 104 and the receiving means 106. Further, in an embodiment, a user may select an available seat or seat area with a touch input and the selection serves also as a car call to the floor in which the selected seat is located.

The elevator signalization apparatus 100 also comprises transmitting means 108 for transmitting a control signal to an elevator controller based on the received user associated information. In an embodiment, the control signal may comprise a floor selection from the user. In another embodiment, the control signal may additionally comprise information about a seat or seat area selection. This means that the user may be required to separately select a floor and a seat or seat area in this floor. In another example, if the elevator signalization device 100 is able to provide a seat arrangement for a floor, a selection of a specific seat from the user may cause transmission of a control signal that comprises only the floor associated with the selected seat or both the floor and an indication of the selected seat. In another example, the elevator signalization apparatus may further comprise third transmitting means for transmitting the seat selection to the floor occupancy system. This enables a solution where the elevator call and the seat selection may be performed at a single point (i.e. at the elevator signalization apparatus).

In an embodiment, the second receiving means are configured to identify the user based on the user associated information. The user identification may refer, for example, to facial recognition performed using a camera and associated face recognition software, an RFID reader based identification arranged in the elevator signalization apparatus 100 or by an entrance door, or to a touch-sensitive display based solution via which the user may input his personal identifier, for example, a person identification number. The apparatus 100 may further comprise processing means for obtaining preference data based on the user identification and for filtering the floor occupancy information based on the preference data. Alternatively, user identification information may be transmitted to a floor occupancy information system, and the filtering is performed by the floor occupancy information system. The floor information received by the elevator signalization apparatus 100 has been filtered based on the user identification information.

In an embodiment, the floor occupancy information provided to users may relate to floor occupancy data associated with a single company or multiple companies.

As discussed above, the elevator signalization apparatus may be configured to identify the user. The identification may refer, for example, to facial recognition performed using a camera and associated face recognition software, an RFID reader arranged in the elevator signalization apparatus 100 or by an entrance door, or to a touch-sensitive display via which the user may input his personal identifier, for example, a person identification number. Thus, when the user has been identified, only floor occupancy information that is associated with the company the user works for may be shown to the user.

In one embodiment, in response to user identification, for example, using facial or RFID recognition, the obtained preference data may be based on fixed or dynamic preferences. Fixed preference may refer, for example, to a specific seat or seat area that the user prefers. Dynamic preference may refer, for example, to preference data that changes upon time. In one example, machine learning may be used to learn patterns of a specific user. In another example, the dynamic preference may be based on social media data or to project data for which the user words. For example, people working for the same project can be directed to a certain floor and/or seat area.

Further, the floor occupancy situation in a building may significantly vary. For example, construction or renovation work may result in closure of one or more floors at a time. The floor occupancy system may be kept updated about these type of changes, and floors associated with the construction or renovation work may be excluded from the floor occupancy information. Similarly, in certain areas or cities, for example, London City, it may be more beneficial for a principal tenant renting office space to rent it onwards to a secondary tenant, for example, during summer time etc. In these situations the floor occupancy system may be kept updated about these type of changes.

Figure 2A:
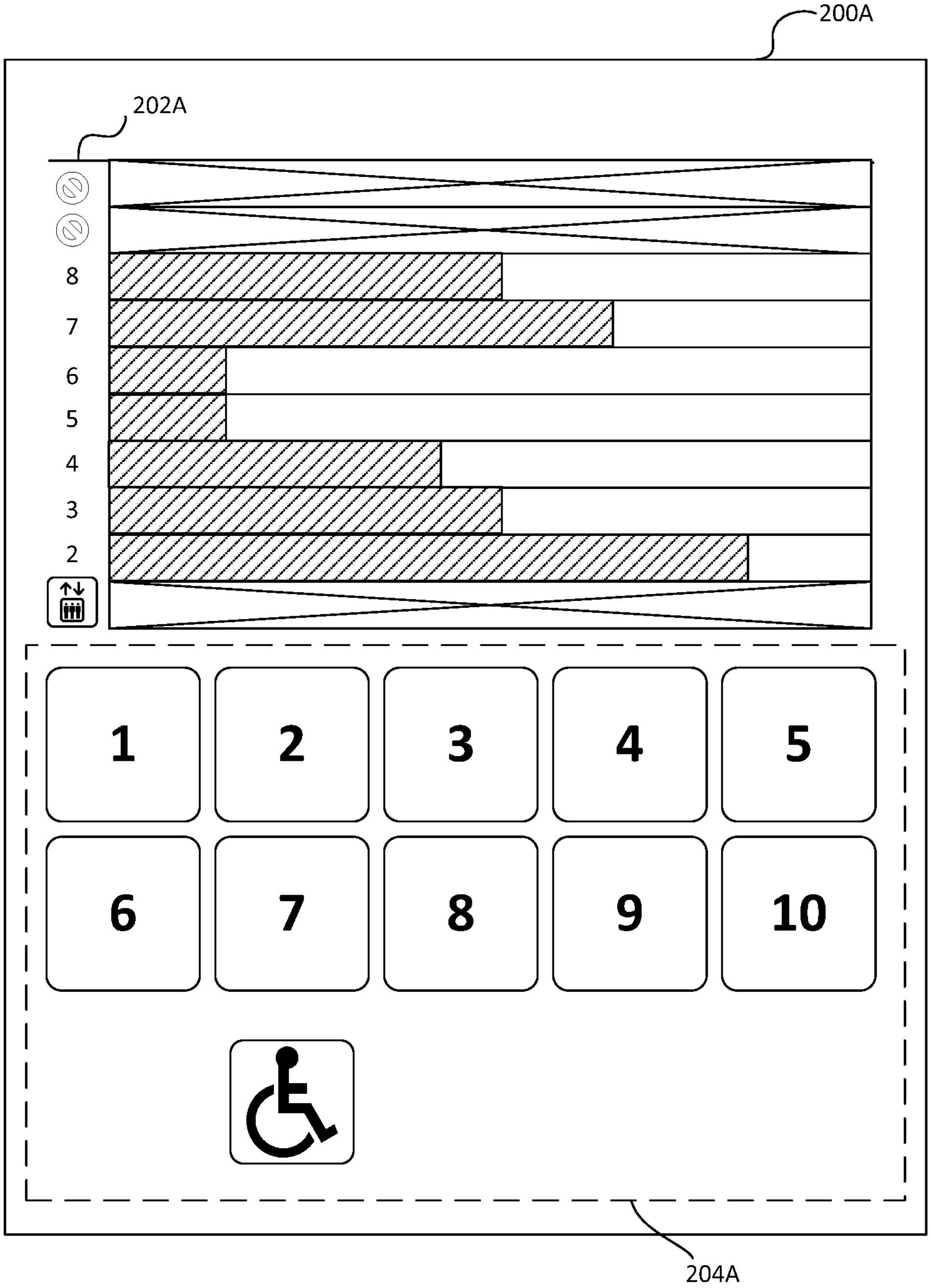
FIG. 2A illustrates an elevator signalization apparatus according to an embodiment.

FIG. 2A illustrates an elevator signalization apparatus 200A according to an embodiment. The elevator signalization apparatus 200A may, for example, be a destination call panel of an elevator or an elevator group.

The elevator signalization apparatus 200A comprises first receiving means for receiving floor information representing floor occupancy information associated with a building from a floor occupancy information system, output means 202A for indicating floor occupancy to guide a user decision based on the floor information and second receiving means 204A for receiving input from the user.

The output means 202A may comprise a display indicating the floor occupancy information to guide the user decision. As illustrated in FIG. 2A, the occupancy level of each floor may be indicated, for example, with bars, wherein striped sections may be used to indicate the level of occupied workspaces and blank sections may indicate the level of available workspaces. Thus, the user may be able to perceive the floor occupancy status of the building by a single glance. The lowermost bar in FIG. 2A represents a lobby floor. The two topmost bars may indicate restricted floors. The floors with no available workspaces may be also equipped with symbols and/or colors indicating non-availability.

The floor occupancy information of the building may be received by the first receiving means from an elevator controller. The first receiving means may refer to a receiver configured to receive information from the elevator controller. The elevator controller may have filtered the floor occupancy information sent to elevator signalization apparatus 200A. In one example, the filtering has been performed so that the operation of the elevator or the elevator group may be improved. Alternatively or additionally, the filtering may be based on other aspects, for example, associated with the building.

In another example, the filtering may have been performed based on user information. For example, the user may have been identified when approaching the elevator signalization apparatus 200A, and the elevator signalization apparatus 200A may have sent user information to the elevator controller or to a floor occupancy information system providing floor occupancy information. Thus, this means that the information provided by the display may be user dependent.

In an example, the first user in the morning may have selected to go to the floor 4. The elevator controller may then filter the floor occupancy information so that it allures also next users to select the same floor, even though there may be plenty of room in each other floor of the building. In the exemplary illustration of floor occupancy in FIG. 2A, the floor occupancy information may be indicated such that the floors 2 to 8 are filled throughout the day. Floors 9 and 10 may be illustrated as restricted floors even though they may actually be completely empty and available. In other words, the floor occupancy information provided by the elevator signalization apparatus 200A may be used to guide the users to fill in the floors so that elevator traffic efficiency may be increased. As users are guided to the floors on a centralized basis, there may not be traffic to the top most floors during the day. This may also enable additional savings as lighting and air-conditioning can be kept off in the respective floors for the day. Other savings may be achieved from reduced cleaning expenses.

Figure 2B:
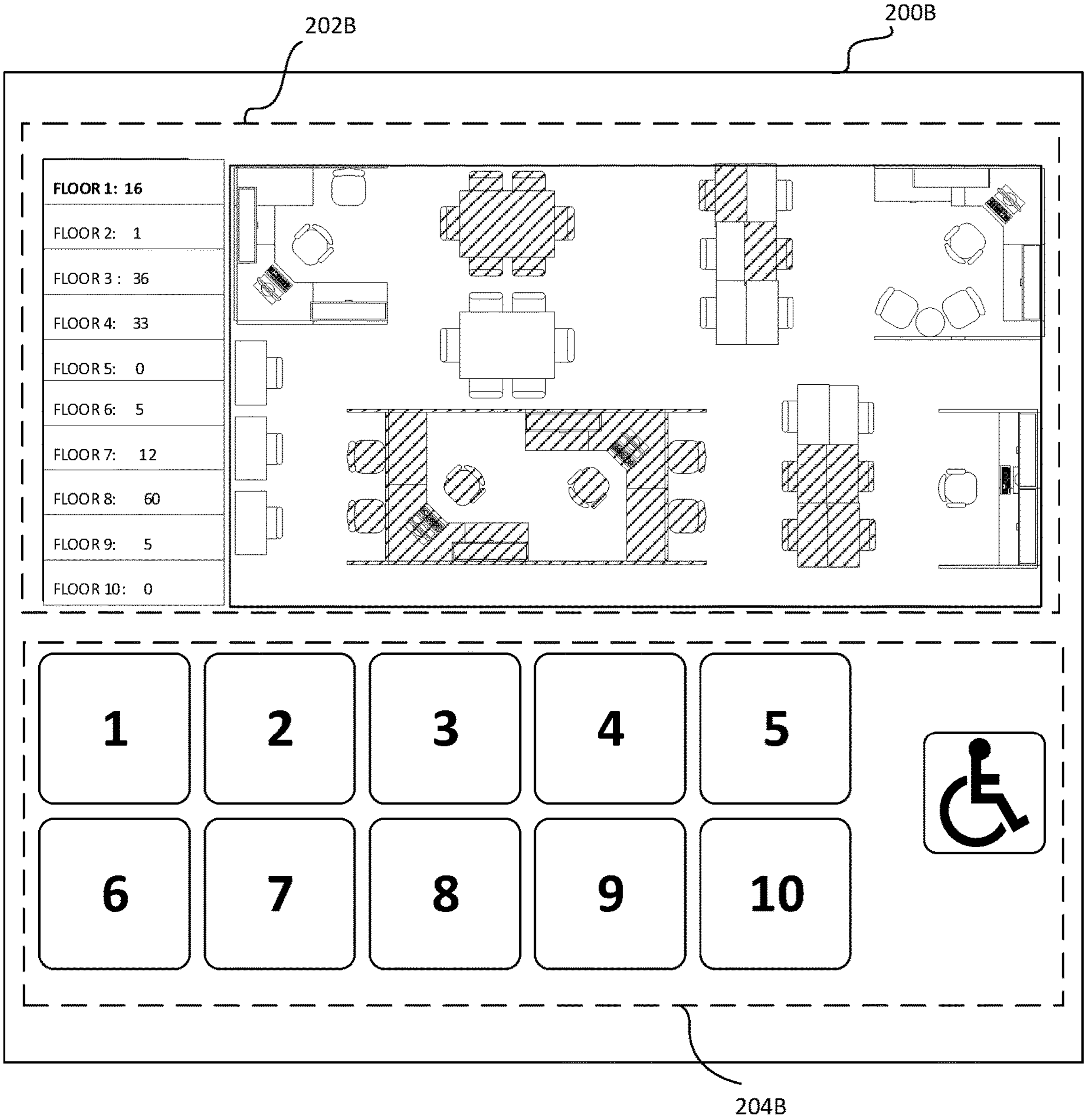
FIG. 2B illustrates an elevator signalization apparatus according to an embodiment.

FIG. 2B illustrates an elevator signalization apparatus 200B according to another embodiment. The elevator signalization apparatus 200B may be a destination call panel with a touch-sensitive screen.

In FIG. 2B, output means 202B may comprise a touch-sensitive screen for indicating floor occupancy information to guide a user decision. For example, the output means 202B may indicate the number of available working spaces in conjunction with floor numbers of a building. In addition, by selecting the floor number from the touch sensitive screen 202B, the user may see a more detailed view of the floor occupancy, for example, as a layout of the floor (as illustrated in FIG. 2B) or by using other ways to provide floor occupancy information.

In addition, the elevator signalization apparatus 200B comprises second receiving means 204B for receiving an input from the user. The second receiving means 204B may comprise at least one push button or virtual button. In an embodiment, the second receiving means 204B may be integrated with the output means 202B. This means that the touch sensitive screen may act both as input means and as output means. As an example, the user may select a specific workspace he would like to reserve for the day. The selection of the workplace may simultaneously act as the input from the user, and in response to the user input the elevator signalization apparatus 200B may transmit a control signal to an elevator controller to make an elevator call to the respective floor of the reserved workplace with transmitting means for transmitting a control signal to the elevator controller (not shown in FIG. 2B).

Figure 3A:
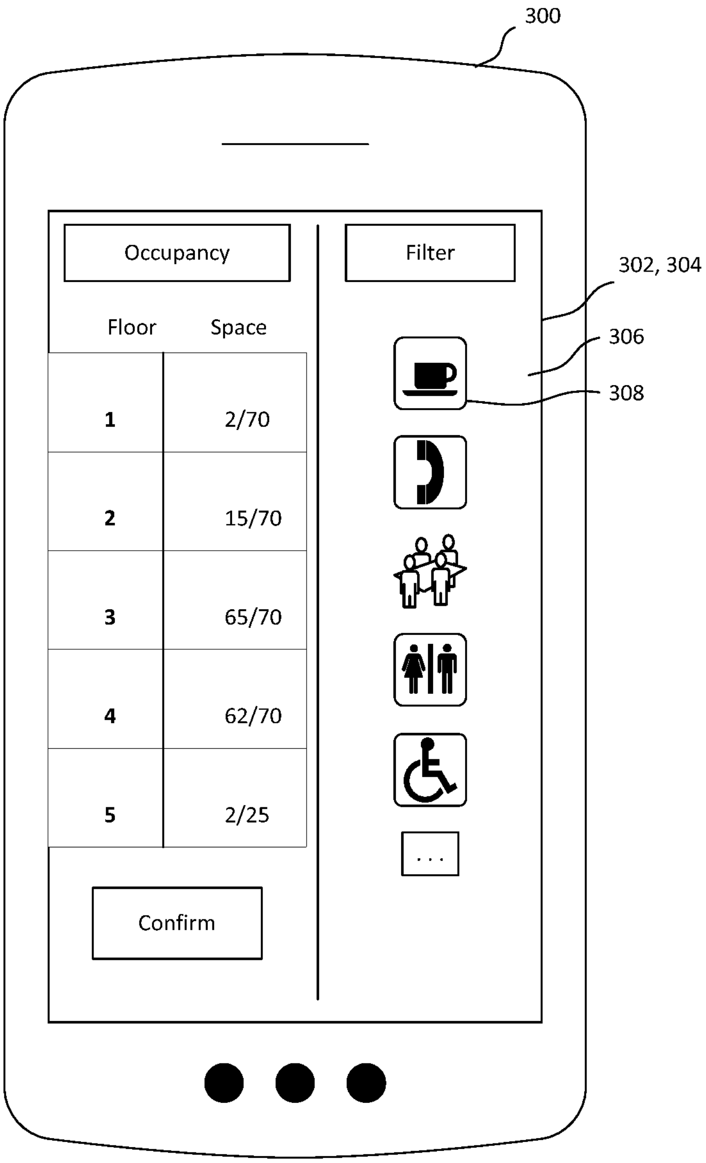
FIG. 3A illustrates an elevator signalization apparatus according to another embodiment.
Figure 3B:
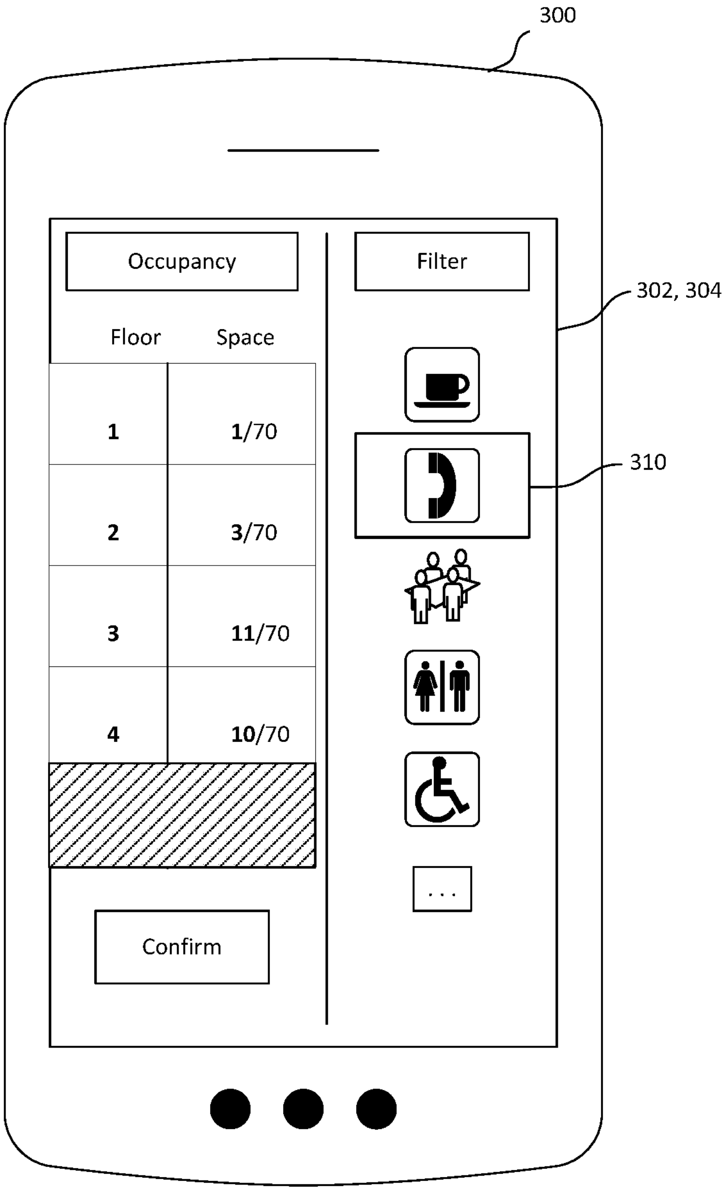
FIG. 3B illustrates an elevator signalization apparatus according to another embodiment.

FIGS. 3A and 3B illustrate an elevator signalization apparatus 300 according to an embodiment. The elevator signalization apparatus 300 may be a remote call giving device, such as a mobile phone or other hand-held device. The elevator signalization apparatus 300 may execute an application with which a user is able to initiate elevator calls.

In FIG. 3A, the elevator signalization apparatus 300 has received floor occupancy information associated with a building with first receiving means (not illustrated in FIGS. 3A and 3B), for example, with a wireless transceiver. The floor occupancy information is indicated by output means 302 which may be, for example, a touch-sensitive display of the elevator signalization apparatus 300. The elevator signalization apparatus 300 comprises also second receiving means 304 for receiving input from a user. As illustrated in FIGS. 3A and 3B, the second receiving means 304 may be integrated with the output means 302. The touch sensitive display 302 may further comprise an option section 306 with which the user may filter the floor occupancy information according to his preferences by providing an input to the second receiving means 304 via selection of one of the provided icons 308.

Alternatively, or in addition, the floor occupancy information may be filtered automatically based on user information or user identification information prior to the floor information been sent to the elevator signalization apparatus 300. Users may want to see the available working spaces according to their personal preferences or according to their needs for the day. For example, if the user has call conferences scheduled for the day, he may want to select a meeting room or a place near a soundproofed booth. In other examples, some users may prefer working next to social areas, in quiet spaces, next to a window or in group working areas. Thus, by enabling the possibility to filter the floor occupancy information provided by the elevator signalization apparatus 300, the user may be able to make the most suitable elevator call to fit his needs.

Providing an indication of the floor occupancy to guide the user decision based on user preferences is further illustrated in FIG. 3B. The user may have selected filtering available workspaces suitable for having call conferences, as illustrated with framed phone icon 310. In response to the selection, the output means may indicate the floor occupancy by removing the available working spaces without the possibility to have call conferences at the working space or nearby the working space.

For example, as illustrated in FIG. 3B, the touch sensitive screen may show a different number of available spaces (bolded numbers) than in the unfiltered information shown in FIG. 3A, and the floor 5 may be removed from the available floors because the floor may not have any suitable workplaces to answer the needs of the user. The user may dispatch a floor call simply by selecting the floor in the occupancy section, or by separately confirming the floor call selection in order to cause the elevator signalization apparatus to transmit a control signal to an elevator controller based on the received user input.

Figure 4A:
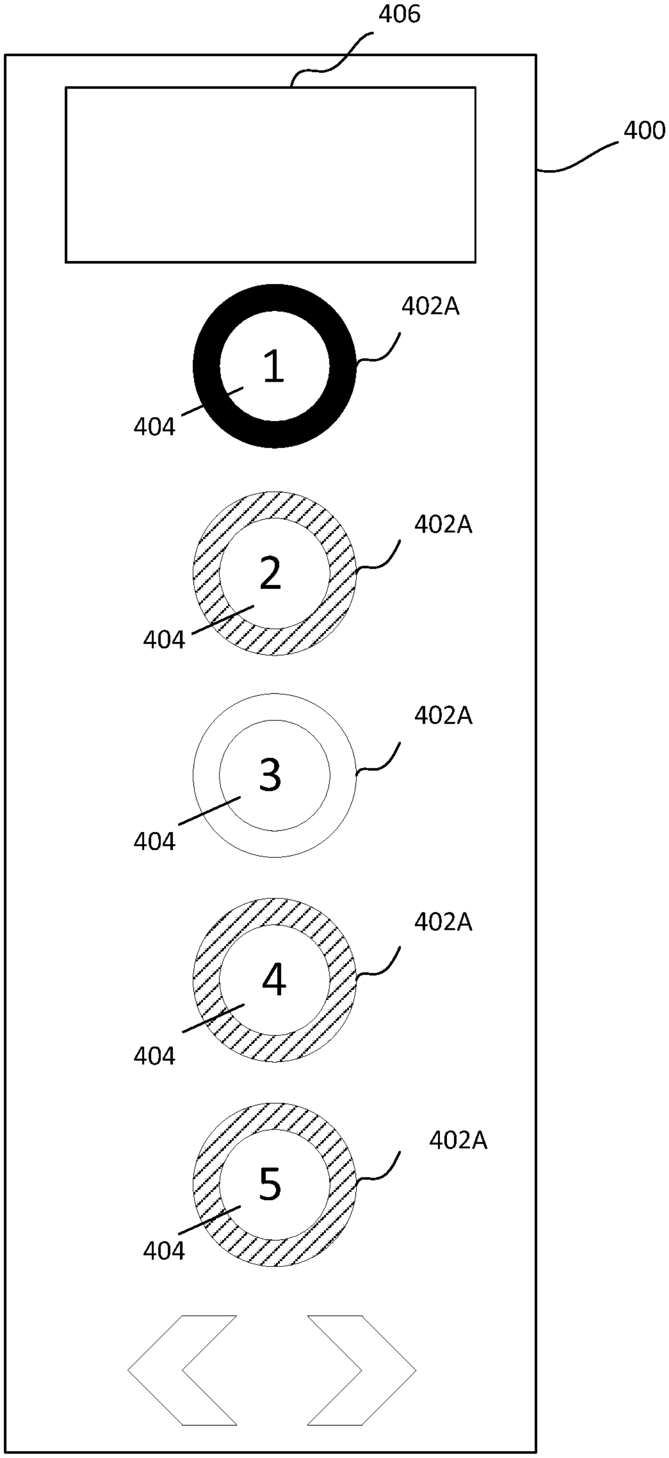
FIG. 4A illustrates an elevator signalization apparatus according to one embodiment.
Figure 4B:
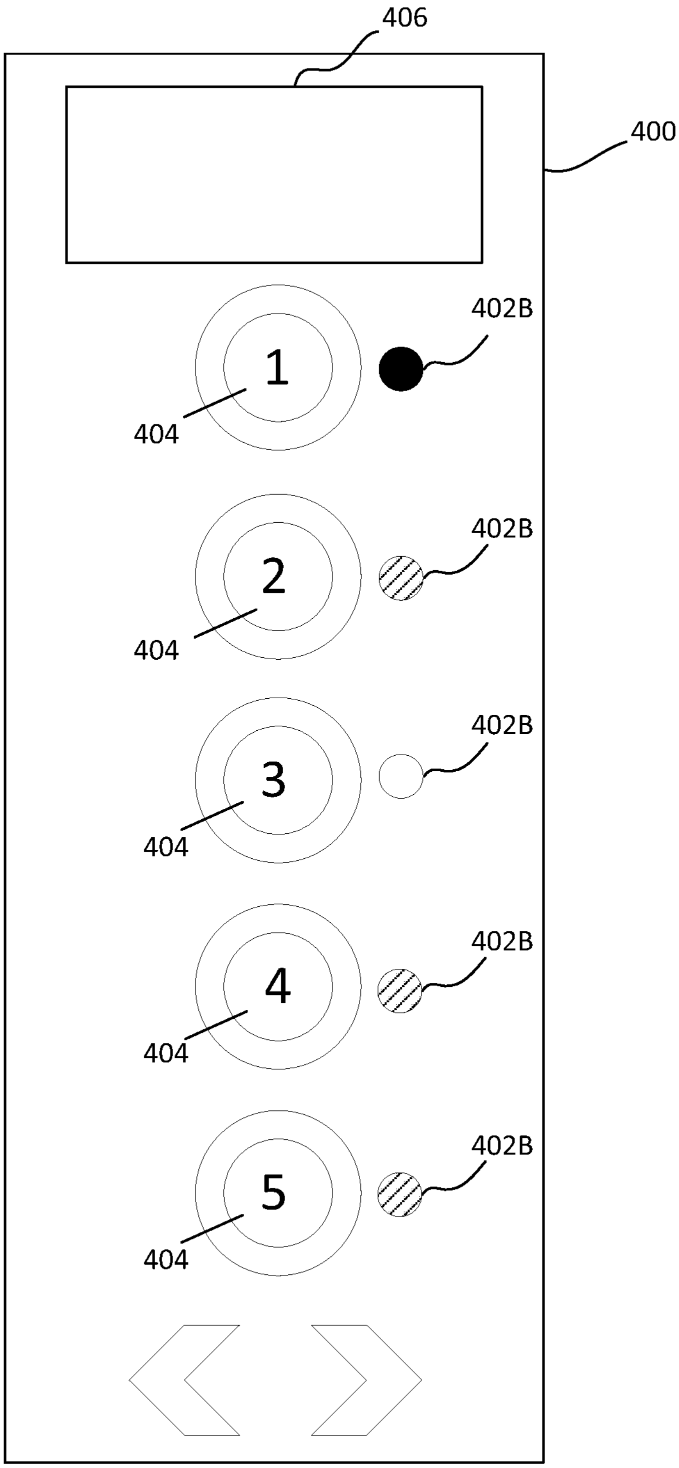
FIG. 4B illustrates an elevator signalization apparatus according to another embodiment.

FIGS. 4A and 4B illustrate an elevator signalization apparatus 400 according to another embodiment. The elevator signalization apparatus 400 may be, for example, a car call panel inside an elevator car.

The elevator signalization apparatus 400 comprises second receiving means 404 for receiving an input from a user. The second receiving means 404 may comprise at least one push button or virtual button. Output means of the elevator signalization apparatus 400 may comprise a display or a touch-sensitive screen as illustrated in FIG. 2A or 2B. Alternatively, the output means 402A, 402B may comprise a lighting arrangement. The output means 402A may be, for example, circulating the second receiving means 404, as illustrated in FIG. 4A. Alternatively, the output means 402B may be located, for example, next to the second receiving means 404, as illustrated in FIG. 4B. The lighting arrangement may comprise, for example, light emitting diodes (LED) configured to provide different colors in response to the floor occupancy information received with first receiving means (not shown in FIGS. 4A, 4B). Hence, a user in the elevator car may be guided to provide an appropriate user input as the user is able to perceive the occupancy level of each floor at with a single glance.

In FIGS. 4A and 4B, the floor 1 may have red light, as illustrated with solid coloring, to indicate that the floor is fully occupied. Floors 2, 4 and 5 may have another illustrative coloring, such as orange or yellow (illustrated with stripes), to indicate that there are some room left in the respective floors. Floor 3 may have green lighting circulating the button (FIG. 4A) or next to the button (FIG. 4B) to indicate that there are plenty of available working spaces in the floor. Although in one example the occupancy level of the floors is indicated as traffic lights for the users, also other indications may be used, such as the brightness of the lighting. In another example, only the buttons of floors with available workplaces may be visible to a user making a call.

The occupancy information corresponding to the reality may be provided to the users, or the occupancy information received from the elevator controller may be processed by the controller in such a way that the users are guided to fill in the floors efficiently. For example, the floor 1 may be illustrated as fully occupied even when it is completely empty. This enables that the users may be guided to fill in the available workspaces in a guided order for efficient usage of the flexible work spaces. For example, the elevator controller may have recognized that eight people has entered the elevator car. In response to this, the elevator controller may transmit floor occupancy information to the first receiving means of the elevator signalization apparatus 400 so that the output means 402A, 403B of the elevator signalization apparatus 400 may induce the group inside the elevator car to choose the same floor with enough space for each arrival.

Figure 5:
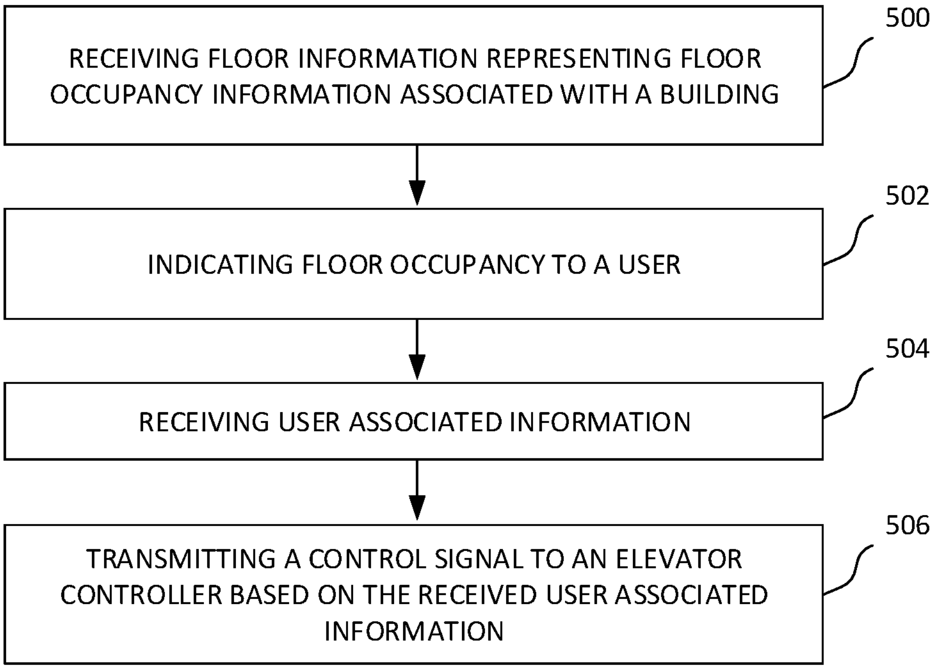
FIG. 5 illustrates a method for utilizing floor occupancy information associated with a building according to an embodiment.

FIG. 5 illustrates a method for utilizing floor occupancy information associated with a building. The method may be performed by an elevator signalization apparatus, for example, a destination call panel located in an elevator lobby, a car call panel inside an elevator car or a remote call giving device, for example, a mobile device or a mobile phone operated by a user. The apparatus may also comprise an application executed in it that enables elevator call signalization.

At 500, floor information representing floor occupancy information associated with a building is received. The floor information may be received, for example, from an elevator controller or a floor occupancy monitoring system associated with the building.

At 502, the floor occupancy is indicated to a user. The floor occupancy may be indicated, for example, a display, a touch-sensitive screen or a lighting arrangement associated with the elevator signalization device.

At 504, user associated information is received. The user associated information may comprise, for example, an input from the user. The input may be with, for example, at least one push button, virtual button, a touch-sensitive screen and/or gesture recognition means associated with the elevator signalization device. The input may comprise, for example, a destination call, a car call or a seat selection in a specific floor of the building. In another example, the user may be identified based on the user associated information. The user identification may refer, for example, to facial recognition performed using a camera and associated face recognition software, an RFID reader based identification arranged in an elevator signalization apparatus or by an entrance door, or to a touch-sensitive display based solution via which the user may input his personal identifier, for example, a person identification number.

At 506, a control signal is transmitted to an elevator controller based on the received user associated information. The control signal may comprise a floor selection from the user. In another embodiment, the control signal may additionally comprise information about a seat or seat area selection.

Figure 6:
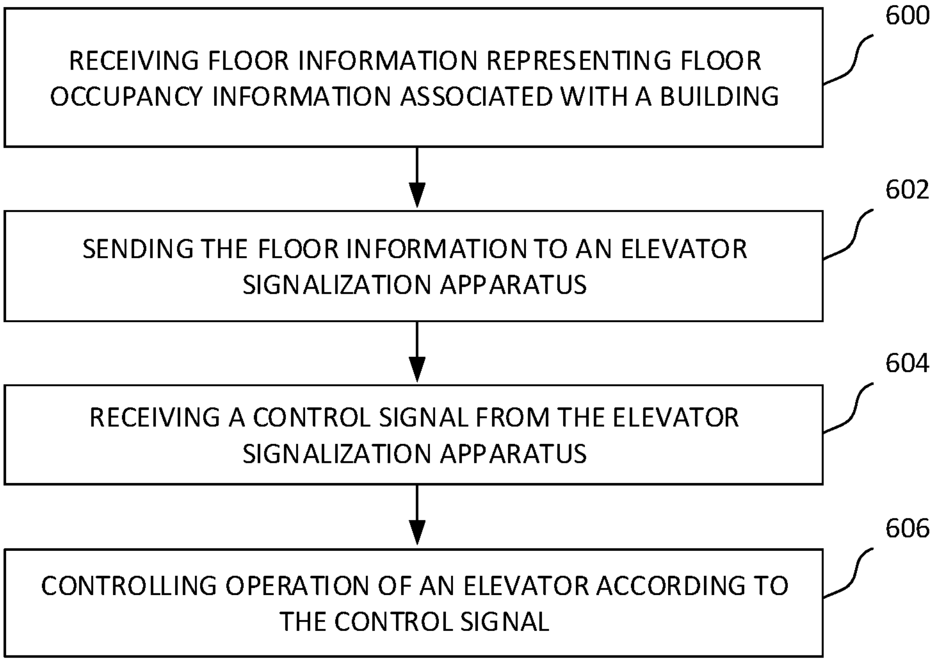
FIG. 6 illustrates a method for controlling an elevator according to an embodiment.

FIG. 6 illustrates a method for controlling an elevator according to an embodiment. The method may be performed by an elevator controller of an elevator system.

At 600, floor information representing floor occupancy information associated with a building is received. The floor information may be received from a floor occupancy information system. The floor occupancy information system may be an internal system of an elevator system or an external system connected to the elevator system.

At 602, the floor information is sent to an elevator signalization apparatus. The elevator signalization apparatus may be, for example, a destination call panel located in an elevator lobby, a car call panel inside an elevator car or a remote call giving device, for example, a mobile device or a mobile phone operated by a user.

At 604, a control signal is received from the elevator signalization apparatus. The control signal may comprise a floor selection from the user. In another embodiment, the control signal may additionally comprise information about a seat selection.

At 606, operation of an elevator car is controlled according to the control signal. The control may comprise, for example, allocating an elevator car for the user. Additionally, if the control signal comprises a seat selection, the seat selection may be sent to the floor occupancy information system.

Figure 7:
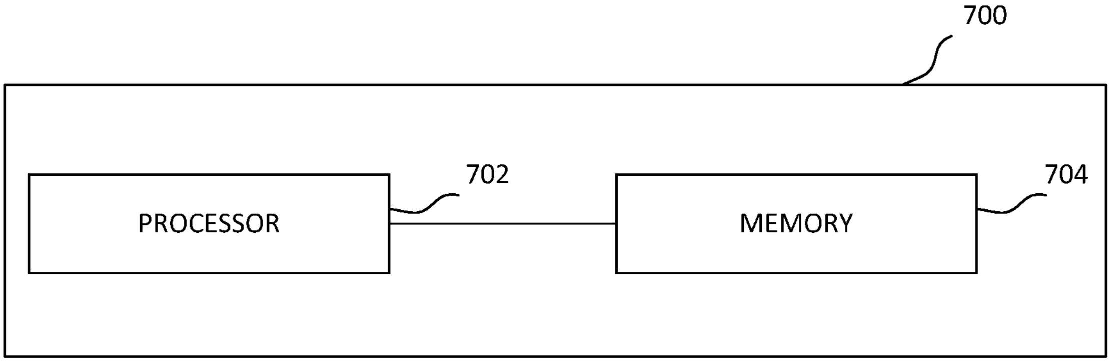
FIG. 7 illustrates an elevator controller according to an embodiment.

FIG. 7 illustrates a controller 700 of an elevator system according to an embodiment.

The controller 700 comprises at least one processor 702 and at least one memory 704, the at least one memory 604 comprising program instructions which when executed by the at least one processor 702, causes the controller 700 to receive floor information representing floor occupancy information associated with a building; send the floor occupancy information to an elevator signalization apparatus; receive a control signal from the elevator signalization apparatus; and control operation of an elevator car according to the control signal.

In an embodiment, the at least one memory 704 stores program instructions that, when executed on the at least one processing unit 702, causes the controller 600 to receive user information; filter the floor information based on the user information; and send the filtered floor information to the elevator signalization apparatus.

The exemplary embodiments and aspects of the invention can be included within any suitable device, for example, including, servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution.

Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator signalization apparatus, comprising:

a first receiver configured to receive floor information representing floor occupancy information associated with a building, wherein the floor occupancy information comprises available working spaces or occupied working spaces at the corresponding floor;

an output for indicating the floor occupancy information to a user;

a second receiver configured to receive user associated information; and a first transmitter configure to transmit a control signal to an elevator controller based on the received user associated information, wherein the second receiver is further configured to receive an input from the user, said input being a selection representing at least one of different user preferences for filtering the floor occupancy information, and the output is further configured to indicate the filtered floor occupancy information to the user in which undesired information has been eliminated from the floor occupancy information based on the selection from the user.

2. The elevator signalization apparatus of claim 1, wherein the output comprises at least one of a display, a touch-sensitive screen or a lighting arrangement.

3. The elevator signalization apparatus of claim 1, wherein the output is integrated with the second receiver.

4. The elevator signalization apparatus of claim 1, wherein the second receiver is configured to identify the user based on the user associated information, and wherein the apparatus further comprises:

a processor configured to obtain preference data based on the user identification and to filter the floor occupancy information based on the preference data.

5. The elevator signalization apparatus of claim 1, wherein the second receiver is configured to identify the user based on the user associated information, and wherein the apparatus further comprises:

a second transmitter configured to transmit user identification information to a floor occupancy information system, wherein the received floor information has been filtered based on the user identification information.

6. The elevator signalization apparatus of claim 1, wherein the second receiver comprises at least one of a push button, a virtual button, a touch-sensitive screen or gesture recognition device.

7. The elevator signalization apparatus of claim 1, wherein the input from the user comprises at least one of a destination call, a car call, a seat area selection or a seat selection.

8. The elevator signalization apparatus of claim 7, wherein the control signal comprises an elevator call.

9. The elevator signalization apparatus of claim 8, further comprising a third transmitter configured to transmit the seat selection or seat area selection to the floor occupancy system.

10. A controller of an elevator system, the controller comprising:

at least one processor; and at least one memory, wherein the at least one memory stores program instructions that, when executed on the at least one processor, causes the controller to:

receive floor information representing floor occupancy information associated with a building, wherein the floor occupancy information comprises available working spaces or occupied working spaces at the corresponding floor;

send the floor information to an elevator signalization apparatus according to claim 1;

receive a control signal from the elevator signalization apparatus; and control operation of an elevator car according to the control signal.

11. The controller of claim 10, wherein the at least one memory stores program instructions that, when executed on the at least one processor, causes the controller to:

receive user identification information from the elevator signalization apparatus;

filter the floor information based on the user identification information; and send the filtered floor information to the elevator signalization apparatus.

12. An elevator system comprising;

the elevator signalization apparatus of claim 1; and a controller, the controller comprising:

at least one processor; and at least one memory, wherein the at least one memory stores program instructions that, when executed on the at least one processor, causes the controller to:

receive floor information representing floor occupancy information associated with a building;

send the floor information to an elevator signalization apparatus;

receive a control signal from the elevator signalization apparatus; and control operation of an elevator car according to the control signal.

13. The elevator system of claim 12, wherein the elevator signalization apparatus is arranged in at least one of an elevator car or an elevator lobby.

14. The elevator system of claim 12, wherein the elevator signalization apparatus is a remote elevator signalization apparatus.

15. A method for providing floor occupancy information, the method comprising:

receiving floor information representing floor occupancy information associated with a building;

sending the floor information to an elevator signalization apparatus according to claim 1;

receiving a control signal from the elevator signalization apparatus; and controlling operation of an elevator car according to the control signal.

16. The elevator signalization apparatus of claim 2, wherein the output is integrated with the second receiver.

17. The elevator signalization apparatus of claim 2, wherein the second receiver is configured to identify the user based on the user associated information, and wherein the apparatus further comprises:

a processor configured to obtain preference data based on the user identification and to filter the floor occupancy information based on the preference data.

18. The elevator signalization apparatus of claim 3, wherein the second receiver is configured to identify the user based on the user associated information, and wherein the apparatus further comprises:

a processor configured to obtain preference data based on the user identification and to filter the floor occupancy information based on the preference data.

19. A method for providing floor occupancy information, the method comprising:

receiving floor information representing floor occupancy information associated with a building, wherein the floor occupancy information comprises available working spaces or occupied working spaces at the corresponding floor;

indicating the floor occupancy information to a user;

receiving an input from the user, said input being a selection representing at least one of different user preferences for filtering the floor occupancy information;

indicating the filtered floor occupancy information to the user in which undesired information has been eliminated from the floor occupancy information based on the selection from the user;

receiving user associated information; and transmitting a control signal to an elevator controller based on the received user associated information.

20. A computer program embodied on a non-transitory computer readable medium and comprising program code, which when executed by at least one processing unit processor, causes the at least one processor to perform the method of claim 19.

* * * * *